US00RE34171E

United States Patent [19]

Romick et al.

[11] E Patent Number: Re. 34,171

[45] Reissued Date of Patent: Feb. 2, 1993

[54] MEDICATION CARTS AND CASSETTES

[76] Inventors: Jerome M. Romick, 170 N. Drexel Ave., Columbus, Ohio 43209; Duane Beardsley, 2552 Ridgewood Trail, Berrien Springs, Mich. 49103

[21] Appl. No.: 719,077

[22] Filed: Jun. 21, 1991

Related U.S. Patent Documents

Reissue of:

[64] Patent No.: 4,616,890
Issued: Oct. 14, 1986
Appl. No.: 691,272
Filed: Jan. 14, 1985

U.S. Applications:

[63] Continuation of Ser. No. 256,919, Oct. 12, 1988.

[51] Int. Cl.[5] ..... A47B 47/00

[52] U.S. Cl. ..... 312/257.1; 312/216; 312/219

[58] Field of Search ..... 312/100, 107, 111, 257.1, 312/216–220; 220/22.2, 22.3, 22.5, 4.01, 400

[56] References Cited

U.S. PATENT DOCUMENTS

| | | | |
|---|---|---|---|
| 427,998 | 5/1890 | Jewell | 312/218 |
| 2,046,810 | 7/1936 | Cannon | 220/4 R |
| 3,327,882 | 6/1962 | Andrews | 220/4 R |
| 3,520,583 | 7/1970 | Case | 312/250 |
| 3,893,740 | 7/1975 | England | 312/216 |
| 4,090,632 | 5/1975 | Katzmann et al. | 220/4 R |
| 4,202,586 | 5/1980 | Oplinger | 312/107 |
| 4,246,769 | 1/1981 | McLaughlin | 312/219 |
| 4,426,120 | 1/1984 | Johnson et al. | 312/107 |
| 4,436,215 | 3/1984 | Kleinert et al. | 220/22.2 |

FOREIGN PATENT DOCUMENTS

| | | | |
|---|---|---|---|
| 2329016 | 2/1975 | Fed. Rep. of Germany | 312/107 R |

*Primary Examiner*—Joseph Falk
*Attorney, Agent, or Firm*—Wood, Herron & Evans

[57] ABSTRACT

Disclosed herein is a medication dispensing system comprising a medication cart having one or more medication cassettes. The panels forming the cassette interlock in an unique manner and are rigidly secured together by an U-shaped frame. Novel lock means insure that medication trays contained in the cassette may be locked.

10 Claims, 4 Drawing Sheets

MEDICATION CARTS AND CASSETTES

Matter enclosed in heavy brackets [ ] appears in the original patent but forms no part of this reissue specification; matter printed in italics indicates the additions made by reissue.

*This application is a continuation of application Ser. No. 07/256,919, filed Oct. 12, 1988.*

BACKGROUND OF THE INVENTION

Medication carts are frequently used in hospitals and nursing homes for dispensing medication to the patients. The prior medication carts of which applicant is aware have suffered from a number of disadvantages including cost and difficulty of construction. They also have not provided a cart and cassette combination with a variety of different cassettes that provide different types and sizes of medication storage receptacles. For these and other reasons there has existed a need for a medication dispensing system which utilizes a cart and easily removable, self-contained, lockable medication cassettes of varying sizes that are capable of accommodating various sizes and types of medication receptacles.

It has therefore been an object of this invention to provide a self-contained medication storage cassette which is easily assembled, and which comprises elements that may be combined to provide cassettes of varying sizes. It has been a further objective to provide such cassettes that have a simple yet safe locking system. These and other objectives of the invention will become apparent from the following description of the invention.

SUMMARY OF THE INVENTION

The medication system of this invention includes a medication cart and removable medication cassette(s). These cassettes are easily removed, easily transported to and from a servicing pharmacy, and easily reinserted into the cart. Simple lock means are provided to prevent unauthorized access to the medication contained in the cassette.

Cassettes of varying heights may be assembled from combining side panels that interlock to form larger, taller side panels. The same top and bottom panels are utilized no matter what height for the side walls is chosen. Each side wall also contains means which permits it to interlock with the top and bottom panels. To rigidly and permanently secure all of the aforesaid panels together, a rigid U-shaped frame member is provided. This member also provides a track which receives a latch bar that is connected to a key lock. When in a locked position the latch bar prevents the withdrawal of a medication tray/shelf.

If desired the medication cassette may be used for storing items other than medications. Also, the cassette by itself is a useful item.

DETAILED DESCRIPTION

Figure 2:
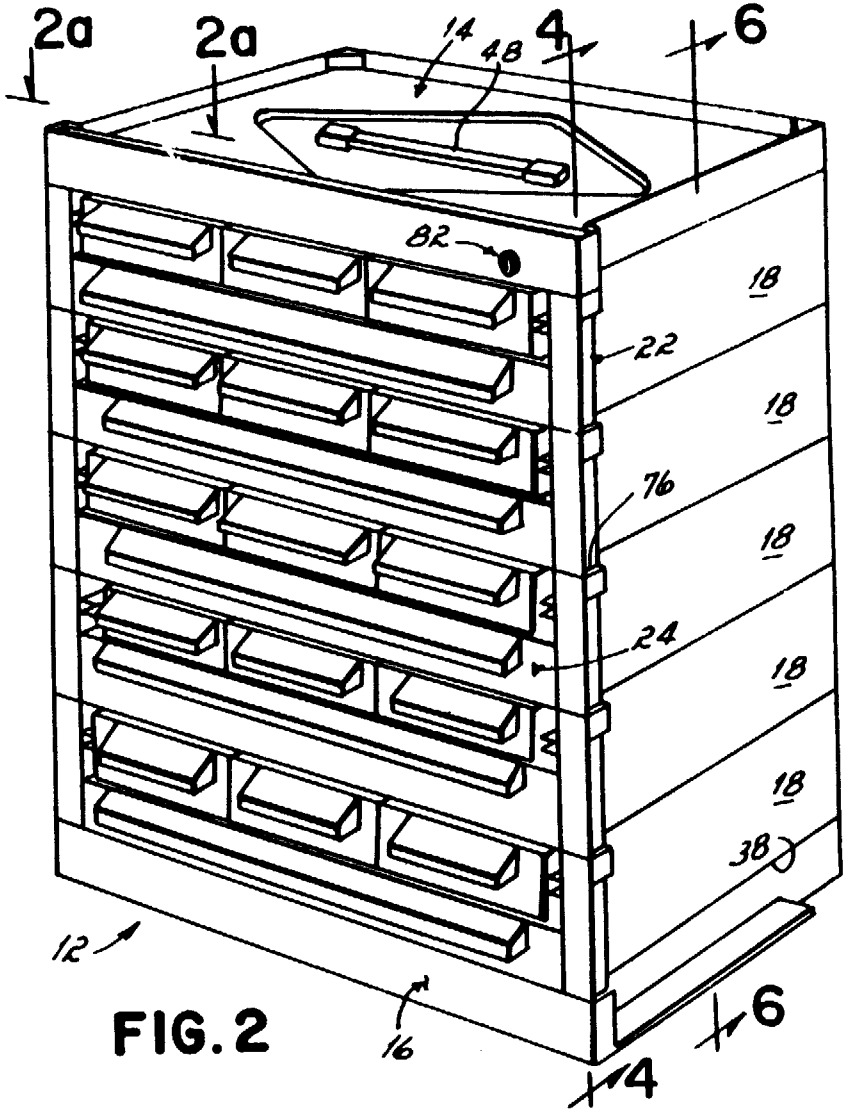
FIG. 2 is a frontal perspective view of a medication cassette.
Figure 1:
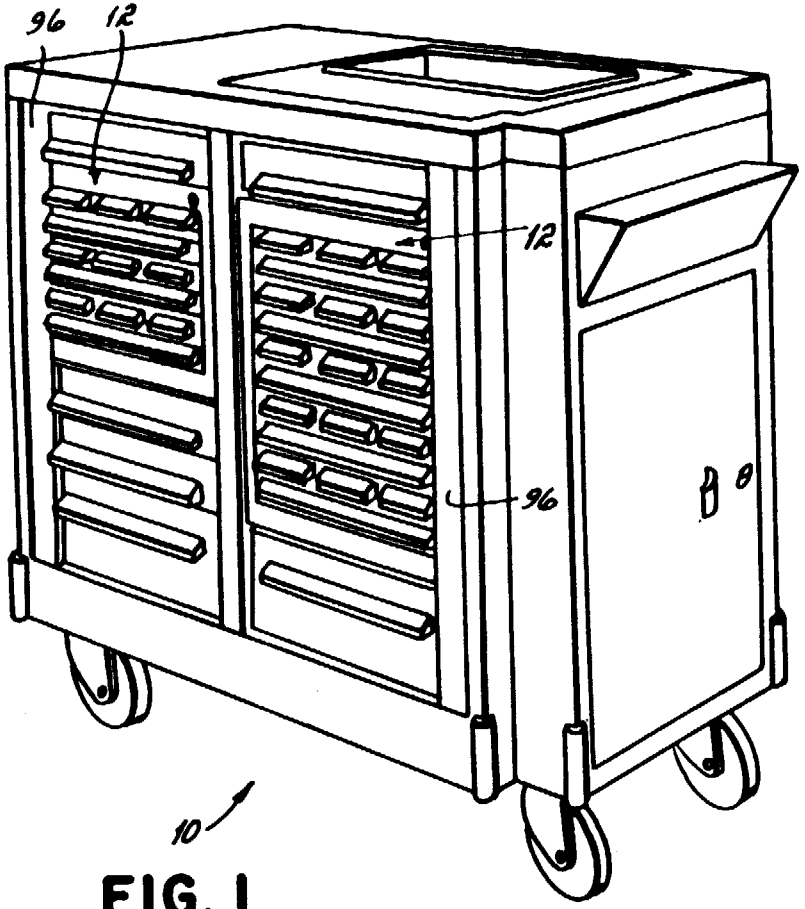
FIG. 1 is a frontal perspective view of a medication cart with medication cassettes in place.
Figure 3:
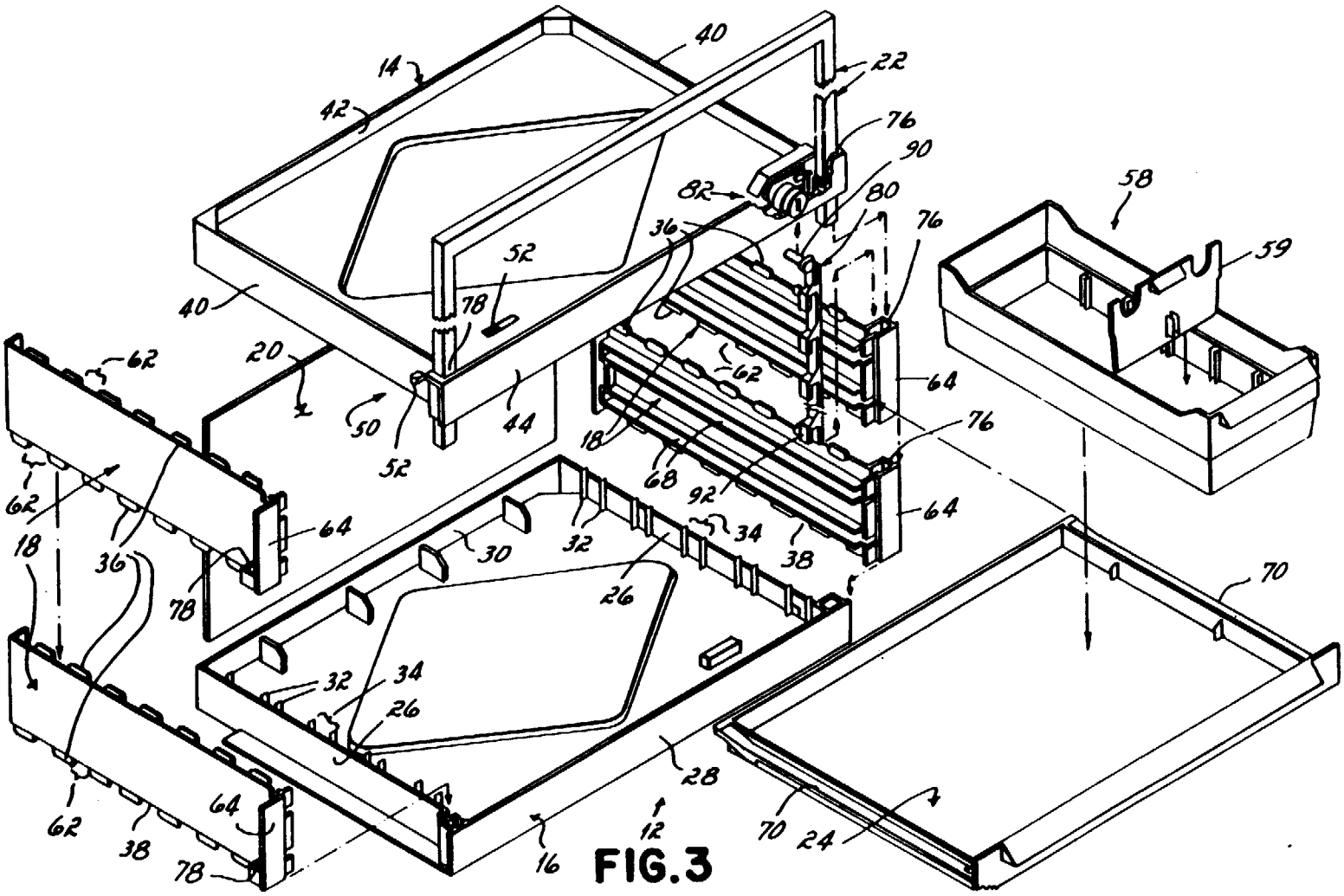
FIG. 3 is an exploded perspective view of a medication cassette.

Referring to FIGS. 1, 2 and 3, the unique medication cart 10 and medication cassettes 12 of the present invention will now be described. The novel cassette holder 12 of the invention includes a top panel 14, a bottom panel 16, a plurality of side panels 18, a back panel 20, a U-shaped frame 22, and a tray/shelf 24. These elements, with the exception of the U-shaped frame 22, may be injection molded from a suitable plastic such as high impact ABS plastic. The U-shaped frame 22 is preferably extruded aluminum.

The bottom panel 16 includes around its periphery, side walls 26, a front wall 28, and a back wall 30. On the inside of each side wall 26 are molded ribs 32 that form channels 34 that are adapted to receive interlock tabs 36 on the bottom side 38 of side panels 18. Similar ribs 32, and channels 34, see FIG. 6, are also included in the side walls 40 of top panel 14. The top panel also has a back wall 42 and a front wall 44.

The top panel 14 may include a carrying handle 48. It may be secured to the top panel 14 by nuts and bolts, not shown.

Figure 2A:
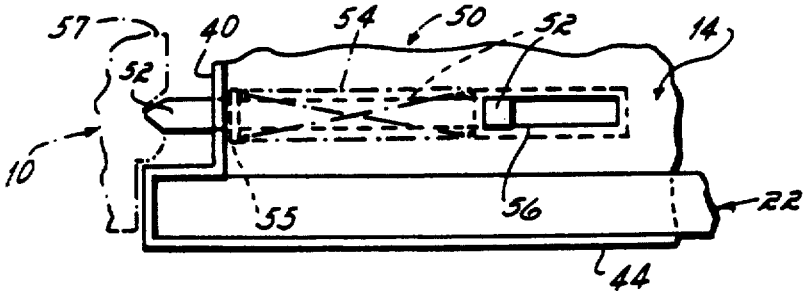
FIG. 2a is a view taken along the lines 2a—2a of FIG. 2 showing the plunger mechanism which holds the cassette in the medication cart.

The top panel 14 preferably includes plunger lock means 50 which may best be seen in FIG. 2 and FIG. 2(a). This means comprises a plunger pin 52 which is surrounded by a plunger spring 54. The spring abuts an annular collar 55 that is molded around the pin. The pin 52 protrudes through an aperture, not shown, in the side wall 40 of the top panel 14. The end which protrudes is wedge shaped. The opposite end is received by a plunger pin channel 56. Because the diameter of the channel is smaller than the diameter of the plunger pin spring 54, the channel 56 provides an abutment means for the spring 54. As installed the spring 54 is compressed so that the plunger pin 52 is always urged outwardly. Cooperating with the plunger lock means 50, and more specifically with the plunger pin 52 is an indentation in the inner side wall 57 of the cart 10 (FIG. 2a), which receives the plunger pin 52 to hold the cassette 12 in place when inserted into the cart. The identation is wedge shaped which permits the cassette 12 to be removed when sufficient force is exerted on the cassette 12 to withdraw it.

As noted earlier one objective of this invention was to provide a simple and easy means for fabricating various size cassettes 12 so that varying numbers of trays/shelves 24 could be accommodated. Such trays/shelves 24 may include medication storage bins 58 with removable dividers 59 if desired. The bins 58 may vary in size.

If desired, a plurality of trays/shelves 24 without bins 58 may be employed. As used herein medication receptacle is meant to include trays/shelves with or without bins 58. The present invention provides cassettes 12 whose height can be easily varied by using a plurality of side panels 18 that may be vertically placed and positioned and locked into place both with respect to one another and with respect to the top panel 14 and the bottom panel 16. Through the novel interlocking arrangement, cassettes of different height can be assembled without the need for fabricating multiple height panels. Thus, the inventory of side panels is minimized. Also, through this system, assembly is simplified.

Figure 6A:
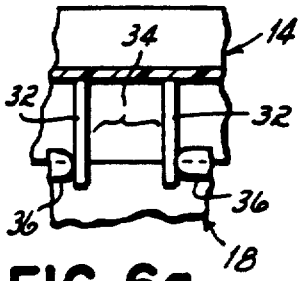
FIG. 6a is a view taken along the lines 6a—6a of FIG. 6.
Figure 6B:
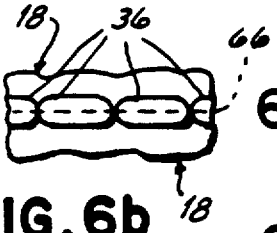
FIG. 6b is a view taken along the lines 6b—6b of FIG. 6.
Figure 6C:
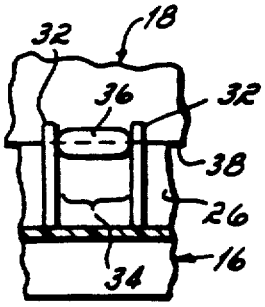
FIG. 6c is a view taken along the lines 6c—6c of FIG. 6.
Figure 6:
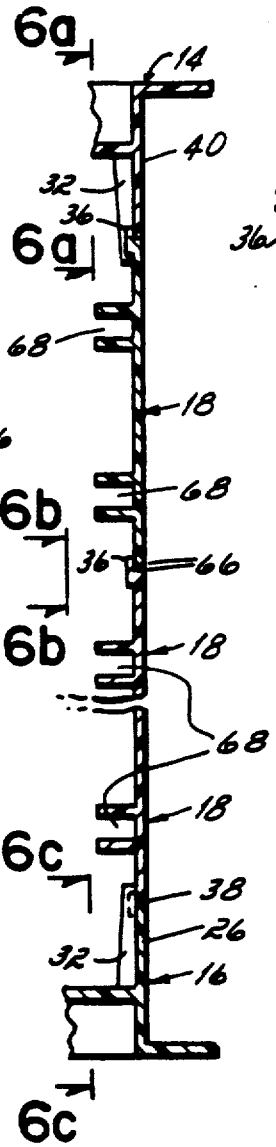
FIG. 6 is a view taken along the lines 6—6 of FIG. 2.

The interlocking means employed can best be understood when viewing FIGS. 3, 6 and 6a–d. Viewing FIG. 3, the side panels 18 on each side are constructed so that they will interlock with one another through the use of interlock tabs 36 that extend above and below the side panels 18. The side panels 18 are designed so that they may be used on either side of the cassette 12. In other words, they are right and left interchangeable. As shown these tabs are rounded but other shapes can be employed. The gap 62 between tabs 36 is about the width of the tab 36. The sequence of spacing of tabs 36 on the top of the side panel 18 is different from that on the bottom. On either the top or the bottom the tabs 36 begin at the front edge 64 of the side panel while on the other the first tab 36 is spaced about one gap 62 from the edge 64. Also, as is shown in FIG. 6, the interlock tabs 36 are integrally molded into the side panel 18 so that they protrude above the mating edge 66 of the side panel 18 but are offset toward the inside of the cassette 12. This permits the mating edges 66 of the top side panel 18 to rest on the mating edge 66 of another side panel 18. The interlock tabs 36 interlock as shown in FIG. 6b with alternating tabs 36 of another side panel 18. In other words, as shown, a tab 36 adjacent to another tab 36 is on a different side panel 18. This interlocking provides a means that frictionally longitudinally secures the side panels 18 together.

The locking tabs 36 also cooperates with the ribs 32 and channels 34 in the top and bottom panels 14 and 16 so that an interlocking frictional fit is obtained when these parts are assembled. FIGS. 6a and 6c show, respectively, the interlock of the top panel 14 and the side panel 18 and the bottom panel 16 and the side panel 18. More particularly, the tabs 36 straddle the ribs 32 into the channels 34 and the mating edges 66 of side panels 18 abut the side walls 26 or 40.

Each side panel 18 also includes at least one and preferably two trays/shelves or drawer guides 68 which cooperates with a side flange 70 which may be integral with the tray/shelf 24. The guide 68 forms a track in which the tray/shelf 24 may slide. As shown in FIG. 3 the side flange 70 extends upwardly toward the rear of the tray/shelf 24 to minimize the possibility that the tray/shelf 24 may be inadvertently removed from the cassette 12. The tray/shelf 24 may be removed by lifting up on its front and withdrawing it. Within the track of the guide 68 is a friction pad, not shown, designed to restrict free movement of the tray/shelf 24 when it is in an unlocked position. This helps to insure that the tray/shelf 24 will not slide out of the cassette 12.

Figure 6D:
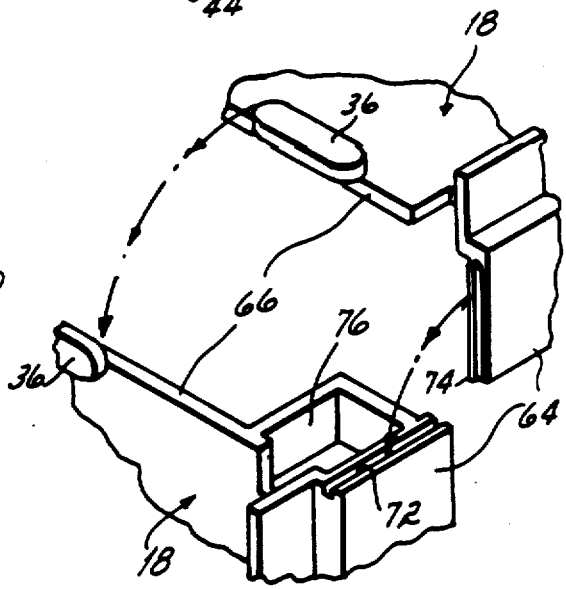
FIG. 6d is a perspective view of a portion of the front of two side walls showing how they can be interlocked.
Figure 7:
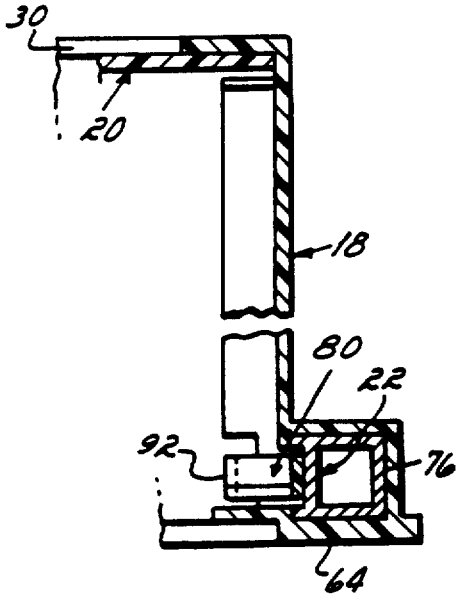
FIG. 7 is a view taken along the lines 7—7 of FIG. 4.

As best seen in FIG. 6d, each side panel 18 has additional means provided to provide an interlock with another side panels 18. More particularly, at the front of the side panel 18, on the top thereof, is a slot 72 which receives a depending tab 74 on the bottom of the front edge of the upper side panel 18. The side panel 18 with tab 74 also as a slot 72 on the upper side. Likewise the side panel shown with slot 72 has a depending tab 74 on the bottom thereof.

Each side panel 18 and the top and bottom panels 14 and 16 at the front thereof include rectangular openings 76 or alternatively on the opposite side channels 78 that receive the U-shaped frame 22 when the various elements forming the cassette 12 have been assembled. A latch bar 80 is positioned in the U-shaped frame 22 for the purpose of locking the tray/shelf 24 in a manner more fully described below. When inserted the U-shaped frame 22 passes through the openings 76 and channels 78 in each side panel 18 and in the top and bottom panels 14 and 16. Rivets, not shown, secure the side panels 18 and the top and bottom panels 14 and 16 to the U-shaped frame. Also, a plastic sheet back panel 20 is riveted to the side panels 18 and to the top and bottom panels 14 and 16.

Figure 4:
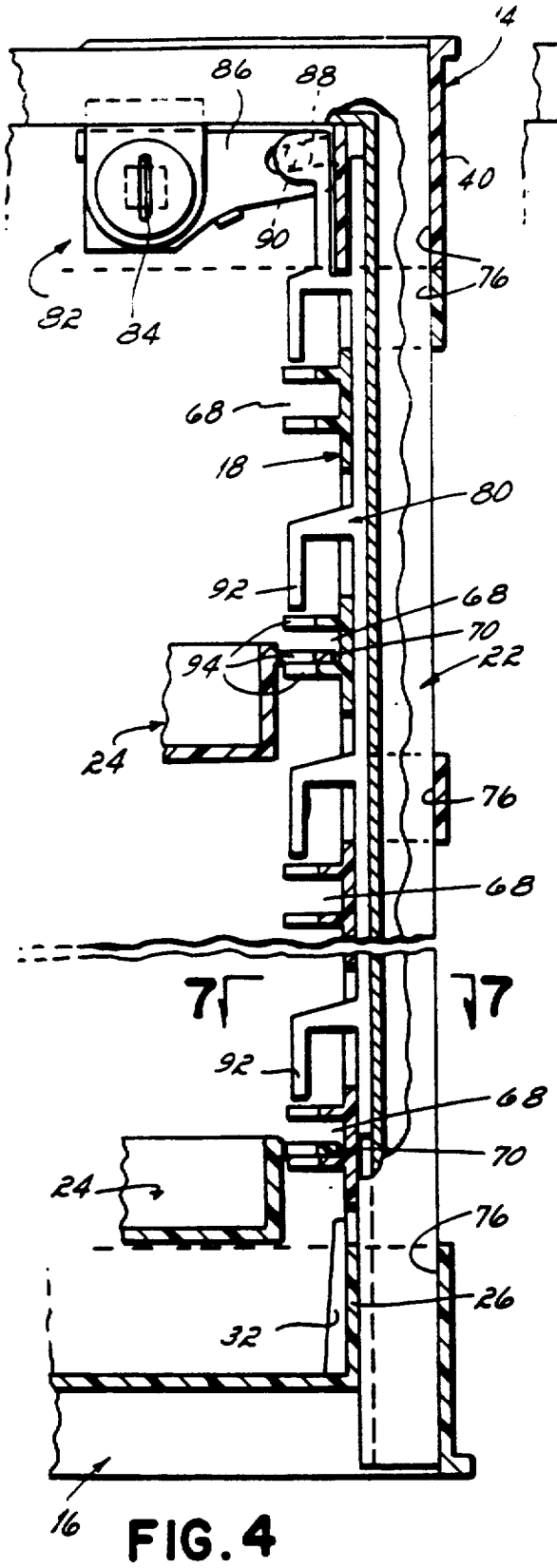
FIG. 4 is a view taken along the lines 4—4 of FIG. 2 showing the medication cassette with tray/shelf in an unlocked position.
Figure 5:
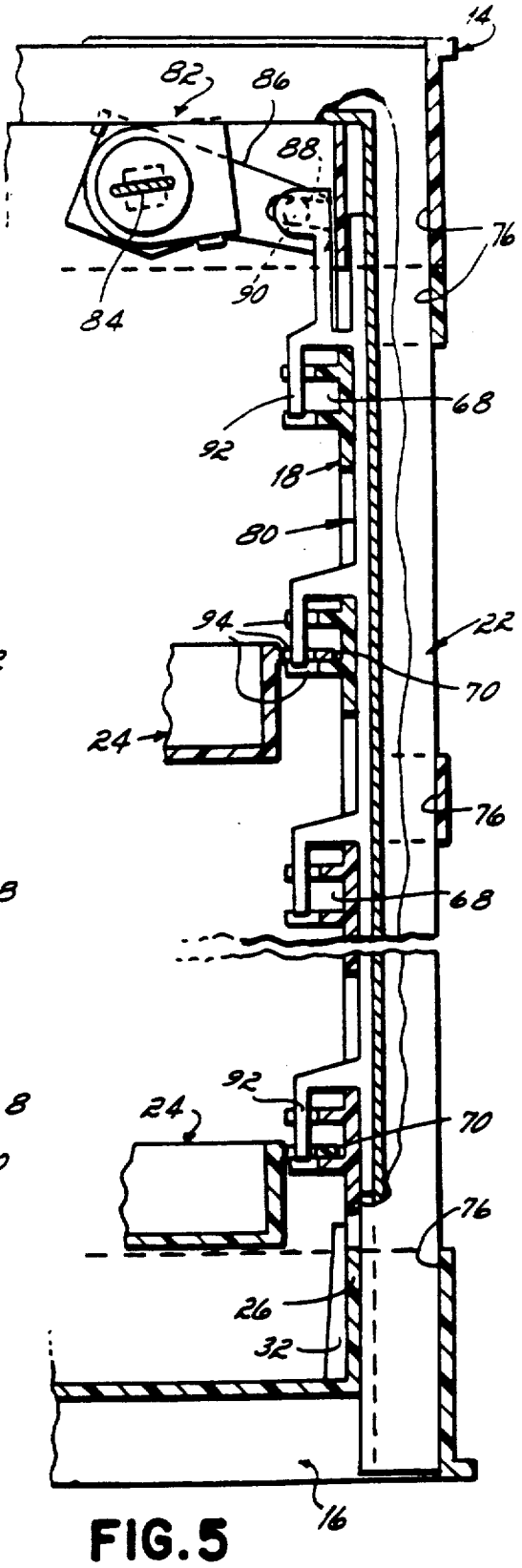
FIG. 5 is a view similar to the view of FIG. 4 but showing the tray/shelf locked by the latch bar.

FIGS. 4 and 5 illustrate the means for locking the trays/shelves 24 in the cassette 12. Attached to the top panel 14 is a conventional key lock 82 shown with a key 84 inserted. An arm 86 extending from and operably attached to the lock 82 includes a slot 88 which receives a pin 90 that is molded into the top of the latch bar 80. Latch bar 80 is positioned within the U-shaped frame 22. The latch bar 80 includes depending legs 92, the number of which coincides with the number of trays/-shelves 24 to be locked. The side flange 70 of the tray/-shelf 24 and the tray/shelf guide 68 include latch bar apertures 94, through which the depending legs 92 of the latch bar 80 penetrate when the latch bar 80 is in the locked position shown in FIG. 5. When the key 84 is turned counterclockwise to the position shown in FIG. 5, to the unlocked position, the arm 86 raises the latch bar 80 which withdraws the depending legs 92 from the latch bar apertures 94 which will then permit the tray/-shelf 24 to be withdrawn. The latch bar may be molded from a high tensile strength, glass filled nylon plastic. If desired a second latch bar 80 and lock 82 may be installed on the other side of the cassette 12, at the bottom, in an inverted position, to provide a second, identical locking system. The purpose of the second system is to provide added security since different keys would be required.

For medication dispensing purposes, the cassettes 12 of the present invention are inserted into the cart 10. The front of the cart includes hinged cassette retainer bars 96 that may be folded outwardly so that the cassettes may be slipped into the cart. Thereafter the retainer bars 96 are pushed inwardly into a closed position to over the side panels 18 of the cassettes 12 to hold them in the cart 10. A lock, not shown, for the retainer bars may be provided if desired. FIG. 1 shows cassettes 12 inserted in one side of the cart 10. The opposite side may likewise receive additional cassettes 12.

The aforedescribed system permits the user to custom design the cart 10 and cassettes 12 so that various size cassettes 12 may be used. Tray/shelves 24 may be selected for the particular type of storage desired. The cassettes 12 are easily removed from the cart 10 and may be easily transported to, or from, a pharmacy where the stock of medication may be replenished.

Having thus described my invention, I claim:

1. A medication cassette for use in a medication cart comprising top, bottom, a plurality of side, and back panels, connecting means on said side panels and said top and bottom panel which cooperate to position the side panels with respect to said top and bottom panels, said connecting means including a plurality of interlock tabs on said side panels adapted to cooperate with interlock tabs on other side panels whereby said side panels may be stacked on top of each other to provide a single planar wall surface, said interlock tabs extending above and below each side panel and spaced apart a distance slightly greater than the width of a interlock tab, said connecting means on said top and bottom panels including ribs that define channels which receive interlock tabs on said side panels,

[a U-shaped frame] *a pair of vertical posts* adapted to engage said side, top and bottom panels to hold said side, top and bottom panels rigidly together, engagement means on said top, bottom and side panels for receiving said [channel frame means] *vertical posts,* means for securing said back panel with respect to said bottom, top and side panels, and a medication receptacle adapted to be inserted in said cassette.

2. The cassette of claim 1 wherein lock means are provided to lock said medication receptacle and to prevent its withdrawal from said cassette.

3. The cassette of claim 2 wherein *said posts are channel shaped and* the lock means includes a latch bar which moves within said channel [frame] *shaped posts.*

4. The cassette of claim 3 wherein there are a plurality of medication receptacles.

5. The cassette of claim 4 wherein the lock means includes a latch bar.

[6. The cassette of claim 5 wherein said latch bar moves within said channel frame.]

7. The cassette of claim 5 wherein said latch bar engages said medication receptacles when said latch bar is in a locked position.

8. The cassette of claim 7 wherein a plurality of latch bars are employed.

9. The cassette of claim 8 wherein the lock means includes separate locks for each latch bar and each lock requires a different key.

10. A medication cart which includes a plurality of the cassettes of claim 1.

* * * * *